(12) United States Patent
Patel et al.

(10) Patent No.: US 6,873,450 B2
(45) Date of Patent: Mar. 29, 2005

(54) MICROMIRRORS WITH MECHANISMS FOR ENHANCING COUPLING OF THE MICROMIRRORS WITH ELECTROSTATIC FIELDS

(75) Inventors: Satyadev R. Patel, Elk Grove, CA (US); Andrew G. Huibers, Palo Alto, CA (US)

(73) Assignee: Reflectivity, INC, Sunnyvale, CA (US)

( * ) Notice: Subject to any disclaimer, the term of this patent is extended or adjusted under 35 U.S.C. 154(b) by 0 days.

(21) Appl. No.: 10/613,379

(22) Filed: Jul. 3, 2003

(65) Prior Publication Data

US 2004/0008402 A1 Jan. 15, 2004

Related U.S. Application Data

(63) Continuation-in-part of application No. 10/155,744, filed on May 24, 2002, now Pat. No. 6,741,383, which is a continuation-in-part of application No. 09/637,479, filed on Aug. 11, 2000, now Pat. No. 6,396,619.

(51) Int. Cl.$^7$ .............................................. G02B 26/00
(52) U.S. Cl. ....................................... 359/291; 359/290
(58) Field of Search ................................ 359/290, 291, 359/292, 223, 224, 332

(56) References Cited

U.S. PATENT DOCUMENTS 5,212,582 A    5/1993  Nelson
5,661,591 A *  8/1997  Lin et al. ..................... 359/290
6,147,790 A   11/2000  Meier et al.
6,522,454 B2   2/2003  Meier et al.
6,529,310 B1 * 3/2003  Huibers et al. ............. 359/291
6,552,840 B2   4/2003  Knipe

\* cited by examiner

*Primary Examiner*—Hung Xuan Dang
*Assistant Examiner*—Tuyen Tra
(74) *Attorney, Agent, or Firm*—Gregory R. Muir (57) ABSTRACT

A micromirror device is disclosed, along with a method of making such a micromirror device that comprises a mirror plate, a hinge and an extension plate. The extension plate is formed on the mirror plate and between the mirror plate and the electrode associated with the mirror plate for rotating the mirror plate. The extension plate can be metallic or dielectric. Also disclosed is a method of making such a micromirror device. In particular, the extension plate is formed after the formation of the mirror plate. Moreover, also disclosed is a projection system that comprises a spatial light modulator having an array of such micromirrors, as well as a light source, condensing optics, wherein light from the light source is focused onto the array of micromirrors, projection optics for projecting light selectively reflected from the array of micromirrors onto a target, and a controller for selectively actuating the micromirrors in the array.

42 Claims, 9 Drawing Sheets

MICROMIRRORS WITH MECHANISMS FOR ENHANCING COUPLING OF THE MICROMIRRORS WITH ELECTROSTATIC FIELDS

CROSS REFERENCE OF RELATED APPLICATIONS

This application is a continuation-in-part of U.S. patent application Ser. No. 10/155,744 to Huibers filed on May 24, 2002 now U.S. Pat. No. 6,741,383, which is a continuation-in-part of U.S. patent application Ser. No. 09/637,479 to Huibers filed on Aug. 11, 2000, which was issued as U.S. Pat. No. 6,396,619 on May 28, 2002, the subject matter of each is incorporated herein by reference.

TECHNICAL FIELD OF THE INVENTION

The present invention is related generally to the art of microelectromechanical systems, and, more particularly, to micromirrors with mechanisms for enhancing coupling of micromirrors with electrostatic fields.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

An early SLM designed for use in a projection display system is described by Nathanson, U.S. Pat. No. 3,746,911. The individual pixels of the SLM are addressed via a scanning electron beam as in a conventional direct-view cathode ray tube (CRT). Instead of exciting a phosphor, the electron beam charges deflectable reflective elements arrayed on a quartz faceplate. Elements that are charged bent towards the faceplate due to electrostatic forces. Bent and unbent elements reflect parallel incident light beams in different directions. Light reflected from unbent elements is blocked with a set of Schlieren stops, while light from bent elements is allowed to pass through projection optics and form an image on a screen. Another electron-beam-addressed SLM is the Eidophor, described in E. Baumann, "The Fischer large-screen projection system (Eidophor)" 20 J. SMPTE 351 (1953). In that system, the active optical element is an oil film, which is periodically dimpled by the electron beam so as to diffract incident light. A disadvantage of the Eidophor system is that the oil film is polymerized by constant electron bombardment and oil vapors result in a short cathode lifetime. A disadvantage of both of these systems is their use of bulky and expensive vacuum tubes.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display.

Another SLM design is the Grating Light Value (GLV) described by Bloom, et al., U.S. Pat. No. 5,311,360. The GLV's deflectable mechanical elements are reflective flat beams or ribbons. Light reflects from both the ribbons and the substrate. If the distance between surface of the reflective ribbons and the reflective substrate is one-half of a wavelength, light reflected from the two surfaces adds constructively and the device acts like a mirror. If this distance is one-quarter of a wavelength, light directly reflected from the two surfaces will interfere destructively and the device will act as a diffraction grating, sending light into diffracted orders. Instead of using active semiconductor circuitry at each pixel location, the approach in the '360 patent relies on an inherent electromechanical bistability to implement a passive addressing scheme. The bistability exists because the mechanical force required for deflection is roughly linear, whereas the electrostatic force obeys an inverse square law. As a voltage bias is applied, the ribbons deflect. When the ribbons are deflected past a certain point, the restoring mechanical force can no longer balance the electrostatic force and the ribbons snap to the substrate. The voltage must be lowered substantially below the snapping voltage in order for the ribbons to return to their undeflected position. Ceramic films of high mechanical quality, such as LPCVD (low pressure chemical vapor deposition) silicon nitride, can be used to form the ribbons. However, there are several difficulties with the GLV. A problem is that a passive addressing scheme might not be able to provide high frame rates (the rate at which the entire SLM field is updated). In addition, with a passive addressing scheme, the ribbons deflect slightly even when off. This reduces the achievable contrast ratio. Also, even though the device is substantially planar, light is scattered, as in the DMD, from areas between the pixels, further reducing the contrast ratio.

Another diffraction-based SLM is the Microdisplay, described in P. Alvelda, "High-Efficiency Color Microdisplays" 307 SID 95 Digest. That SLM uses a liquid crystal layer on top of electrodes arrayed in a grating pattern. Pixels can be turned on and off by applying appropriate voltages to alternating electrodes. The device is actively addressed and potentially has a better contrast ratio than the GLV. However, the device, being based on the birefringence of liquid crystals, requires polarized light, reducing its optical efficiency. Furthermore, the response time of liquid crystals is slow. Thus, to achieve color, three devices—one dedicated for each of the primary colors—must be used in parallel. This arrangement leads to expensive optical systems.

A silicon-based micro-mechanical SLM with a large fractional optically active area is the Digital Mirror Device (DMD), developed by Texas Instruments and described by Hornbeck, U.S. Pat. No. 5,216,537 and other references.

Therefore, what is needed is a spatial light modulator that has a high resolution, a high fill factor and a high contrast ratio. What is further needed is a spatial light modulator that does not require polarized light, hence is optically efficient and mechanically robust.

SUMMARY OF THE INVENTION

In one embodiment of the invention, a micromirror device is disclosed. The micromirror device comprises: a substrate;

a hinge and a hinge support connected to the substrate; a movable reflective mirror plate, wherein the hinge is attached to the mirror plate at a first location on the mirror plate; and an extension plate connected to the mirror pate at a second location on the mirror plate.

In another embodiment of the invention, a micromirror array device is disclosed. The micromirror array device comprises: a substrate; a reflective mirror plate connected to the substrate via a hinge and a hinge support and held by the hinge and the hinge support on the substrate; and an extension plate connected to the mirror plate and connected to the substrate via the mirror plate, the hinge and the hinge support.

In yet another embodiment of the invention, a micromirror device is disclosed. The device comprises: a substrate; a hinge and a hinge support connected to the substrate; a reflective mirror plate attached to the hinge at an attachment point that is located away from a diagonal of the mirror plate when viewed from the top of the substrate; and an extension plate connected to the mirror plate.

In a further embodiment of the invention, a display system is disclosed. The display system comprises: a light source; an array of micromirrors that selectively reflect light from the light source, each micromirror further comprising: a substrate; a hinge and a hinge support connected to the substrate; a movable reflective mirror plate, wherein the hinge is attached to the mirror plate at a first location on the mirror plate; and an extension plate connected to the mirror pate at a second location on the mirror plate; and a set of optical elements for directing light from the light source onto the spatial light modulator and projecting the reflected light from the micromirrors onto a display target.

In yet another embodiment of the invention, a method of making a micromirror device is disclosed. The method comprises: depositing a first sacrificial layer on a substrate; forming a mirror plate on the first sacrificial layer; depositing a second sacrificial layer on the mirror plate; forming a hinge, a hinge support and an extension plate, further comprising: removing a first portion of the second sacrificial layer at a first location above the mirror plate so as to expose a first portion of the mirror plate; and depositing the extension plate on the second sacrificial layer and the exposed first portion of the mirror plate; and removing the first and the second sacrificial layers.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 2 is a cross-sectional view of an exemplary spatial light modulators of FIG. 1a;

FIG. 3b illustrates a micromirror array device comprising an array of micromirror devices of FIG. 3a;

FIG. 4b presents a micromirror array device comprising a plurality of micromirror devices of FIG. 4a;

DETAILED DESCRIPTION OF THE EMBODIMENTS

Processes for micro-fabricating a MEMS device such as a movable micromirror and micromirror array are disclosed in U.S. Pat. Nos. 5,835,256 and 6,046,840 both to Huibers, the subject matter of each being incorporated herein by reference. A similar process for forming MEMS movable elements (e.g. micromirrors) on a wafer substrate (e.g. a light transmissive substrate or a substrate comprising CMOS or other circuitry) is illustrated in the present application. By "light transmissive", it is meant that the material will be transmissive to light at least in operation of the device (The material could temporarily have a light blocking layer on it to improve the ability to handle the substrate during manufacture, or a partial light blocking layer for decreasing light scatter during use. Regardless, a portion of the substrate, for visible light applications, is preferably transmissive to visible light during use so that light can pass into the device, be reflected by the micromirrors, and pass back out of the device. Of course, not all embodiments will use a light transmissive substrate). By "wafer" it is meant any substrate on which multiple micromirrors or microstructure arrays are to be formed and which allows for being divided into dies, each die having one or more micromirrors thereon. Though not in every situation, often each die is one device or product to be packaged and sold separately. Forming multiple "products" or dies on a larger substrate or wafer allows for lower and faster manufacturing costs as compared to forming each die separately. Of course the wafers can be any size or shape, though it is preferred that the wafers be the conventional round or substantially round wafers (e.g. 4", 6" or 12" in diameter) so as to allow for manufacture in a standard foundry.

U.S. patent application Ser. No. 09/910,537 filed Jul. 20, 2001, and 60/300,533 filed Jun. 22, 2001 both to Reid contain examples of materials that may be used for the various components of the current invention. These applications are incorporated herein by reference.

Figure 1A:
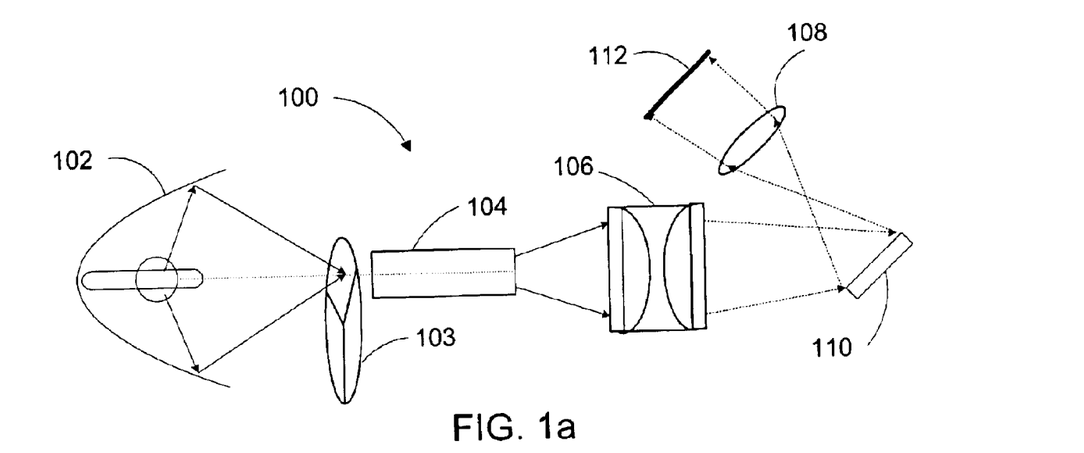
FIG. 1a diagrammatically illustrates an exemplary display system employing a spatial light modulator.

The present invention discloses a micromirror device that comprises mechanisms for enhancing coupling of the micromirror devices with electrostatic fields. The micromirror device has a variety of applications (e.g. maskless lithography, atomic spectroscopy, maskless fabrication of micromirror arrays, signal processing, microscopy etc), one of which is in display systems. A typical display system employing micromirror devices is illustrated in FIG. 1a. In its very basic configuration, the display system comprises light source 102, optical devices (e.g. light pipe 104, collection optics 106 and projection optics 108), display target 112 and spatial light modulator 110 that further comprises a plurality of micromirror devices (e.g. an array of micromirror devices). Light source 102 (e.g. an arc lamp) directs light through the light integrator/pipe 104 and collection optics 106 and onto spatial light modulator 110. The micromirrors of the spatial light modulator 110 are selectively actuated by a controller (e.g. as disclosed in U.S. Pat. No. 6,388,661 issued May 14, 2002 incorporated herein by reference) so as to reflect—when in their "ON" position—the incident light into projection optics 108, resulting in an image on display target 112 (screen, a viewer's eyes, a photosensitive material, etc.). Exemplary operation methods are disclosed in U.S. Pat. No. 6,388,661, and U.S. patent application Ser. No. 10/340,162, filed on Jan. 10, 2003, both to Richards, the subject matter of each being incorporated herein by reference. Generally, more complex optical systems are often used, especially in displaying applications for color images, such as display systems in FIGS. 1b and 1c.

Figure 1B:
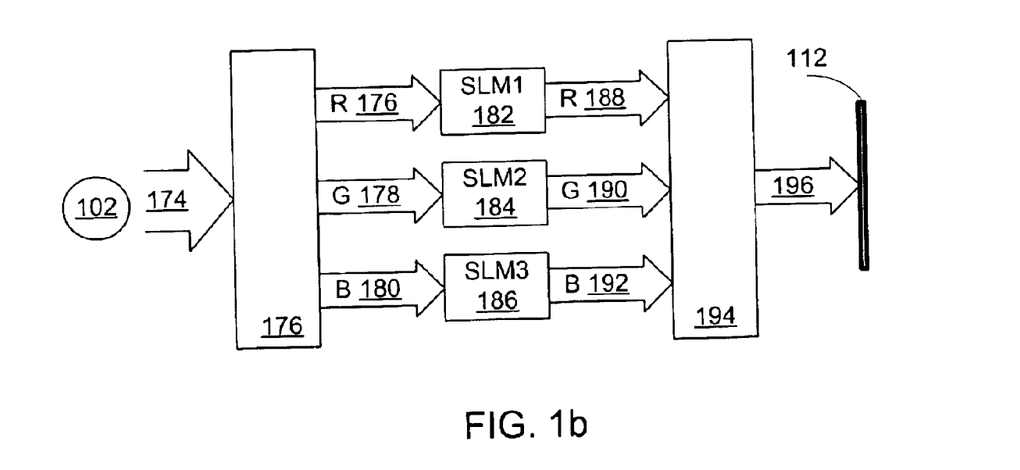
FIG. 1b is block diagram schematically illustrating another display system that employs three spatial light modulators for respectively modulating three primary color (i.e. red, green and blue) light beams.

Referring to FIG. 1b, a block diagram illustrating a display system employing three spatial light modulators, each being designated for respectively modulating the three primary color (i.e. red, green and blue) light beams, is presented therein. As shown, light 174 from light source 102 passes through optical filters 176 and is split into three color light beams, that is, red light 176, green light 178 and blue light 180. Each color light beam impinges a separate spatial light modulator and is modulated thereby. Specifically, red light 176, green light 178 and blue light 180 respectively impinge spatial light modulators 182, 184 and 186, each comprising a micromirror array device, are modulated. The modulated red light 188, green light 190 and blue light 192 are recombined at light combiner 194 for forming modulated color images. Combined color light 196 is directed (e.g. by projection lens) onto display target 112 for viewing. A simplified display system based on the block diagram of FIG. 1b is presented in FIG. 1c.

Figure 1C:
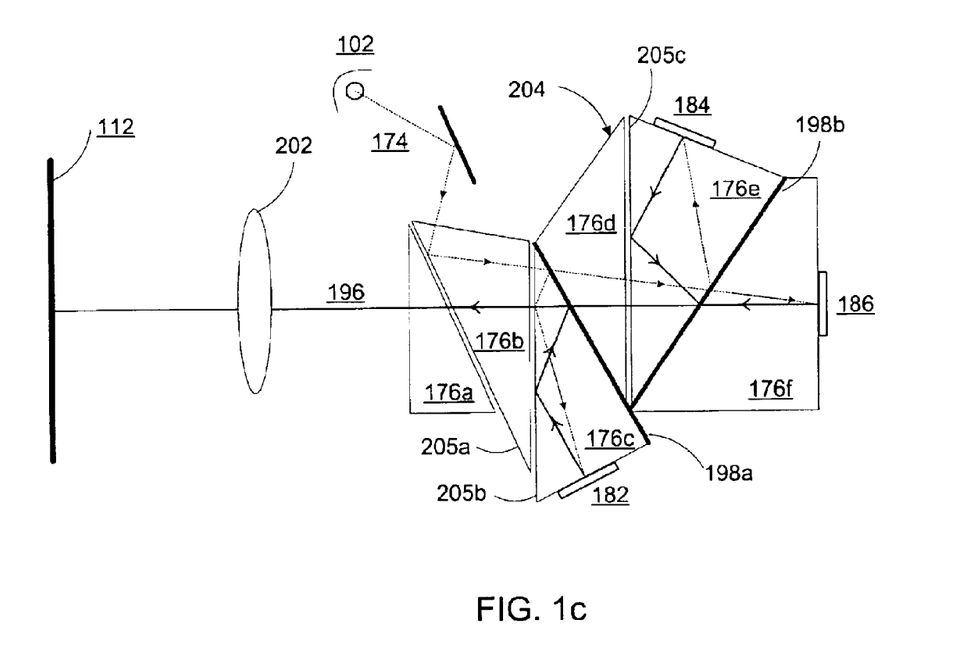
FIG. 1c is an exemplary diagram illustrating the display system of FIG. 1b.

Referring to FIG. 1c, the display system employs a dichroic prism assembly 204 for splitting incident light into three primary color light beams. Dichroic prism assembly comprises prisms 176a, 176b, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

Regardless of whether the optical system utilizes a single micromirror array device as in FIG. 1a, or multiple micromirror array devices as in FIGS. 1b and 1c, reflection from light transmissive substrates is preferably minimized. In operation, incident white light 174 from light source 102 enters into prism 176b and is directed towards TIR surface 205a at an angle larger than the critical TIR angle of TIR surface 205a. TIR surface 205a totally internally reflects the incident white light towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 112 through optic elements, such as projection lens 202, if necessary.

Figure 2:
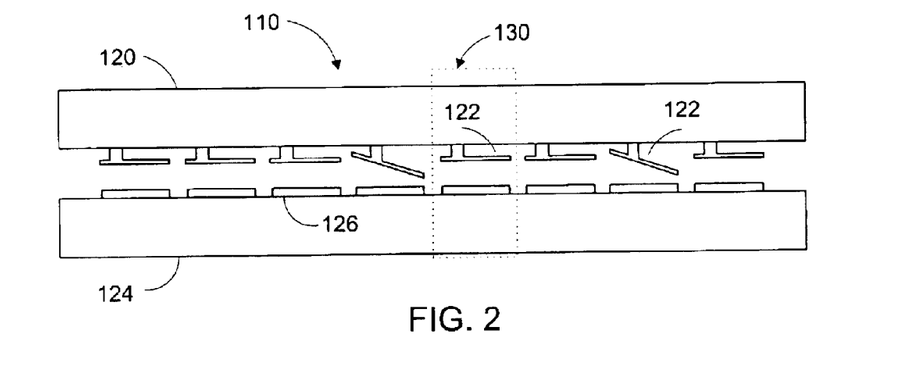

The spatial light modulator, in general, comprises an array of thousands or millions of micromirror devices. FIG. 2 illustrates a cross-section view of a portion of an exemplary micromirror array device that is employed in the display systems of FIGS. 1a through 1c. Referring to FIG. 2, micromirror array device 110 comprises an array of micromirrors (e.g. micromirror 122) formed on substrate 120, which is glass transmissive to visible light in this specific example. The micromirrors spatially modulate incident light by selectively reflecting the incident light onto or away from a projection lens (e.g. projection lens 108 in FIG. 1a) for producing images or videos on a display target (e.g. display target 112 in FIG. 1a). The selective reflection of the incident light by the micromirrors is accomplished with an array of electrodes (e.g. electrode 126) and circuitry (not shown). Specifically, each micromirror comprises a mirror plate, which is associated with an electrode. An electrostatic field can thus be established between the mirror plate and the associated electrode. In response to the established electrostatic field, the mirror plate rotates to either an ON state or an OFF state. In the ON state, the mirror plate reflects the incident light into the projection lens, and in the OFF state, the mirror plate reflects the incident light away from the projections lens. In this particular example, the array of electrodes and circuitry is formed on substrate 124, which is preferably a semiconductor wafer. Alternatively, the electrodes and circuitry can be formed on the same substrate as the micromirrors, which are not shown herein.

Figure 3A:
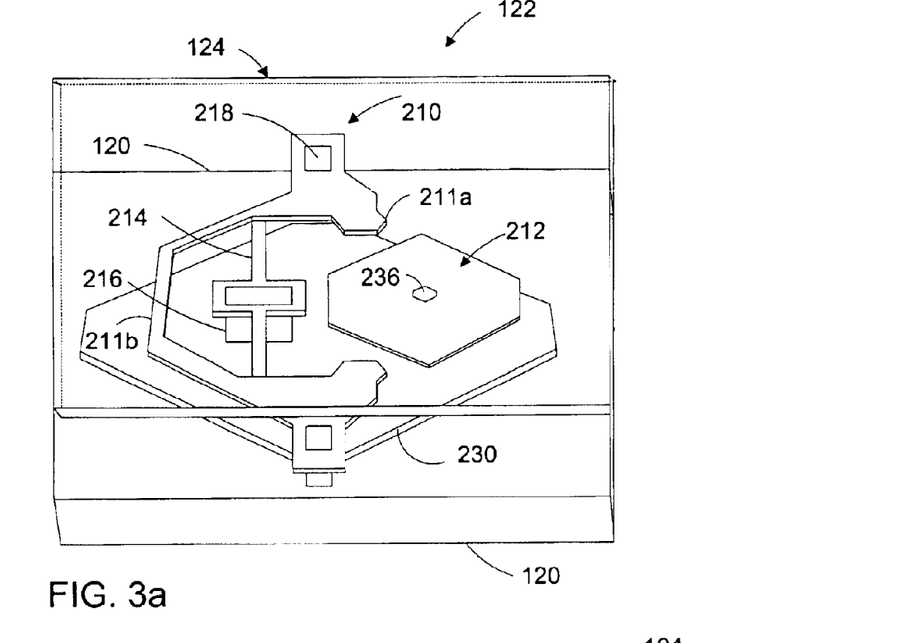
FIG. 3a illustrates an exemplary micromirror device according to an embodiment of the invention.

Referring to FIG. 3a, a perspective view of an exemplary micromirror device is illustrated therein. As seen, hinge support 210 is formed on substrate 120, which is a glass substrate that is transparent to visible light. The hinge support connected to the substrate can include two posts 218. Hinge 214 is affixed to the hinge support. Mirror plate 230 is attached to hinge 214 through hinge contact 216. In this particular example, the attachment point of the mirror plate and the hinge is at a location away from a diagonal (e.g. the diagonal along the line connecting the two posts of the hinge support) of the mirror plate. This configuration facilitates the mirror plate rotates along a rotational axis that is parallel to but offset from the diagonal of the mirror plate when viewed from the top of substrate 120. By "parallel to but offset from the diagonal", it is meant that the axis of rotation can be exactly parallel to or substantially parallel to (±10° degrees) the diagonal of the micromirror. This type of design benefits the performance of the micromirror device in a number of ways. One advantage of this asymmetric offset arrangement is that the micromirror plate can rotate at a larger angle than the rotation angle that can be achieved in a symmetrical arrangement (with a mirror plate—substrate gap being the same). In addition to the posts, the hinge and the hinge contact, hinge support 210 may include additional features. For example, stop 211*a* can be part of the hinge support for stopping the rotation of the mirror plate to the ON state, and it can thus be used to define a uniform ON state angle for the micromirrors of the micromirror array device. Stop 211*b* may also be a part of the hinge support. This stop can be used to stop the rotation of the mirror plate to the OFF state, thus defining a uniform OFF state for the micromirrors of the micromirror array. In order to drive the mirror plate to rotate relative to the substrate, substrate 124 having an electrode and a circuitry (not shown) thereon is placed proximate to the mirror plate.

Figure 6:
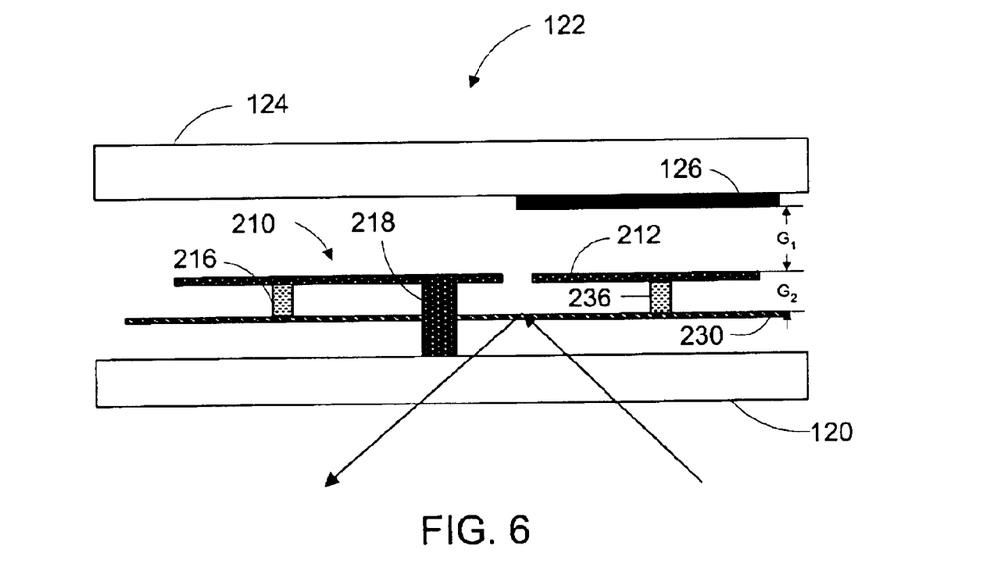
FIG. 6 is a cross-sectional view of a micromirror device according to an embodiment of the invention.

In operation, a first voltage is applied to the mirror plate and a second voltage is applied to the electrode associated with the mirror plate. The voltage difference between the mirror plate and the electrode, as well as the distance therebetween, determines the strength of the electrostatic force exerted to the mirror plate, thus determines the rotation angle of the mirror plate. Given the mirror plate, the electrode and the voltage difference between the mirror plate and the electrode, the electrostatic force is determined by the distance between the mirror plate and the electrode. In particular, the electrostatic force exerted on the mirror plate can be strengthened by reducing the "effective distance" between the mirror plate and he electrode. This is achieved by providing extension plate 212 between the mirror plate and the electrode according to the invention. In an embodiment of the invention, the extension plate is on the opposite side of the mirror plate to the substrate (e.g. substrate 120) on which the hinge support (e.g. hinge support 210) and the hinge are connected. The extension plate is connected to the mirror plate via post 236, and connected to substrate 120 via the mirror plate, the hinge and the hinge support. The location of post 236 on the mirror plate is neither at the center nor at a diagonal of the mirror plate. These relative positions can also be seen in FIG. 6, wherein a cross-sectional view of the micromirror device is illustrated. As shown in FIG. 6, the extension plate defines a first gap $G_1$ between the extension plate and electrode 126; and a second gap $G_2$ between the extension plate and the mirror plate. In a case when the extension plate is extended beyond the mirror plate as shown in FIG. 4*c*, the extension plate defines a third gap between the extension plate and the substrate (e.g. substrate 120 in FIG. 6) to which the mirror plate is connected.

In an embodiment of the invention, the extension plate is metallic, and is electrically connected to the mirror plate. In operation, the mirror extension plate has the same voltage as the mirror plate. However, because the extension plate is closer to the electrode than the mirror plate, electrostatic force exerted to the extension plate is larger than the force to the mirror plate. That is, compared to the required voltage difference between the electrode and the mirror plate to rotate the mirror plate to a desired angle, a smaller voltage difference between the extension plate and the electrode will be enough to rotate the mirror plate to the same desired angle. In the embodiment of the invention, the extension plate has the same distance from the mirror plate as the distance between hinge 214 and the mirror plate. This type of arrangement simplifies the fabrication of the micromirror device, which will be discussed afterwards.

Figure 7:
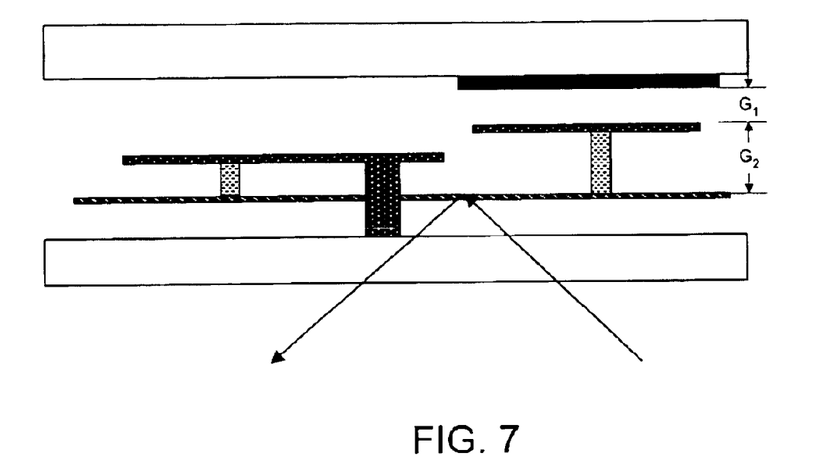
FIG. 7 is a cross-sectional view of a micromirror device according to another embodiment of the invention.

In another embodiment of the invention, the extension plate has a different distance from the mirror plate than the hinge. For example, the distance between the extension plate and the mirror plate is larger than the distance between the hinge and the mirror plate, as shown in FIG. 7. In this situation, the required voltage difference can be even smaller to achieve the desired rotation angle than the necessary voltage difference by the micromirror in FIG. 6 to achieve the same desired angle, wherein the hinge and the extension plate have the same distance from the mirror plate.

In yet another embodiment of the invention, the extension plate is a dielectric plate having a dielectric constant larger than 1. In operation, when voltages are applied to the electrode and the mirror plate, resulting a voltage difference between the electrode and the mirror plate, the electric force exerted to the mirror plate is larger than the electric force exerted to the mirror plate resulted from the same voltage difference established between the mirror plate and the electrode without dielectric plate in between. That is, compared to the required voltage difference between the electrode and the mirror plate to rotate the mirror plate to a desired angle, a smaller voltage difference is necessary to rotate the mirror plate to the same desired angle. Similar to the embodiment wherein the extension plate is metallic, the dielectric extension plate can be spaced from the mirror plate with either the same or a different distance as that between the mirror plate and the hinge.

Figure 3B:
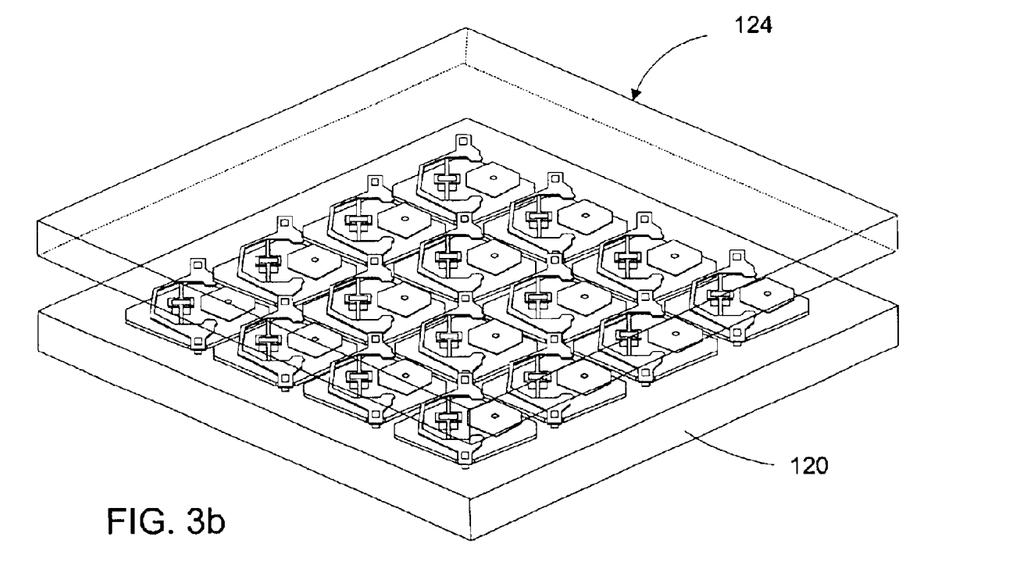

Referring to FIG. 3*b*, a perspective view of a micromirror array device is illustrated therein. The micromirror array device comprises an array of micromirrors of FIG. 3*a*. In display applications, each micromirror device corresponds to a pixel of an image or a video frame. The number of micromirrors in the array determines the resolution of the displayed images and the videos. In the embodiment of the invention, the micromirror array device preferably comprises 1280×720, 14000×1050, 1600×1200, 1920×1080, or 2048×1536 micromirror devices, wherein m×n (e.g. 1280× 720) represent 1280 micromirrors along the length of the micromirror array and 720 micromirrors along the width of the micromirror array. Of course, a micromirror array corresponds to other desired resolutions can also be formed using the micromirror device of FIG. 3*a*.

Figure 4A:
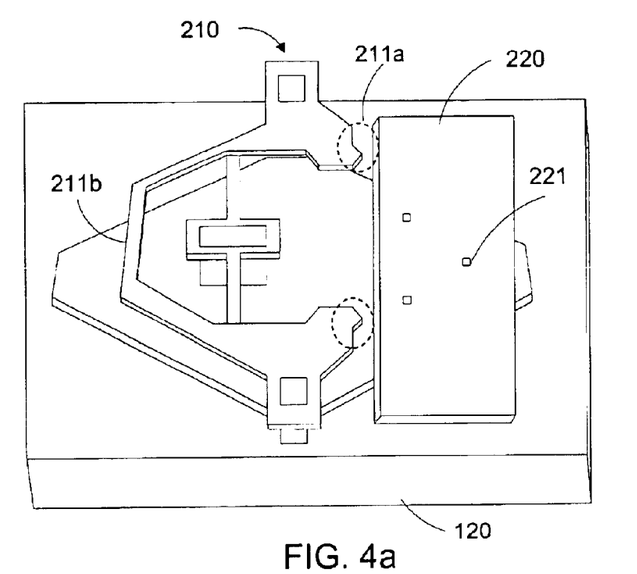
FIG. 4a illustrates another exemplary micromirror according another embodiment of the invention.

Referring to FIG. 4*a*, another exemplary micromirror device according to another embodiment of the invention is illustrated therein. As shown in the figure, extension plate 220 is on the opposite side of the mirror plate to substrate 120 on which hinge support 210 and the hinge are connected. The extension plate is placed between the mirror plate and the electrode (not shown) associated with the mirror plate for rotating the mirror plate. The extension plate is connected to the mirror plate via post 221, and connected to substrate 120 via the mirror plate, the hinge and the hinge support. The location of post 221 on the mirror plate is neither at the center nor at a diagonal of the mirror plate. Unlike that in FIG. 3*a*, extension plate 220 extends beyond the mirror plate. Moreover, the extension plate has a different shape and is connected to the mirror plate via a plurality of posts, such as posts 221. In this particular example, the extension plate has a rectangular shape. In fact, the extension plate can take any desired shape, such as square, rectangle, rhombus, or trapezoid. Moreover, the extension plate can be connected to the mirror plate via any number of posts. Similar to that in FIG. 3*a*, the extension plate in FIG. 4*a* can be metallic or dielectric. When the extension plate is metallic, it is electrically connected to the mirror plate. In either situation, the voltage difference required to rotate the mirror plate to a desired angle is reduced compared to that having no extension plate between the mirror plate and the electrode. Other features, such as stop 211*a* and 211*b* for stopping the rotations of the mirror plate to the ON state and OFF state respectively may also be formed on the hinge support.

Figure 4B:
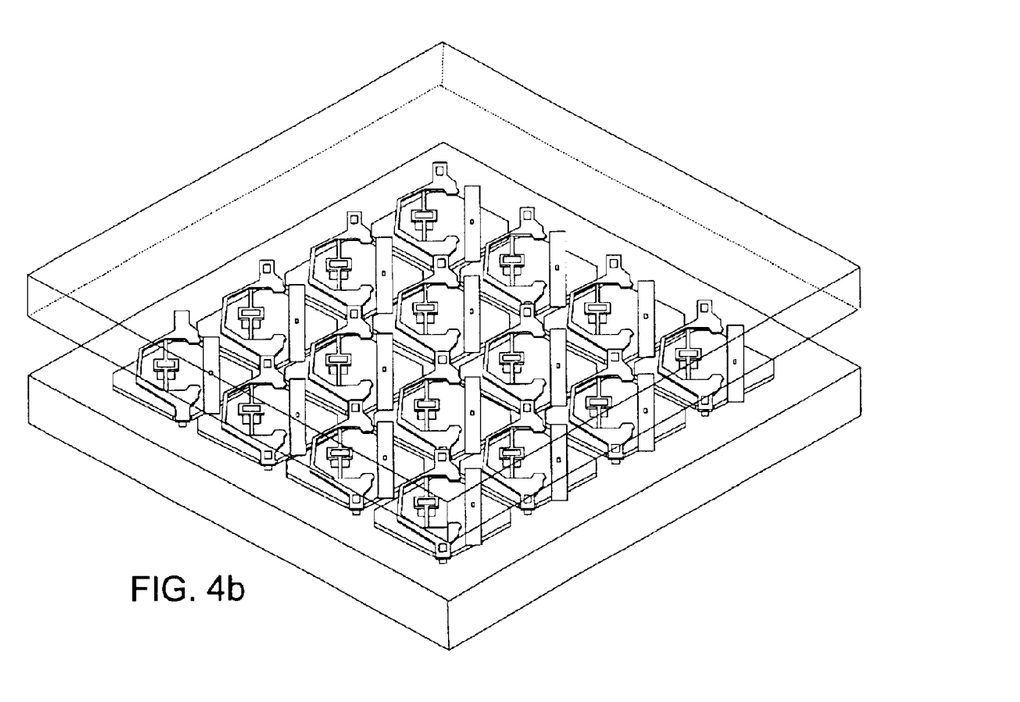
Figure 4C:
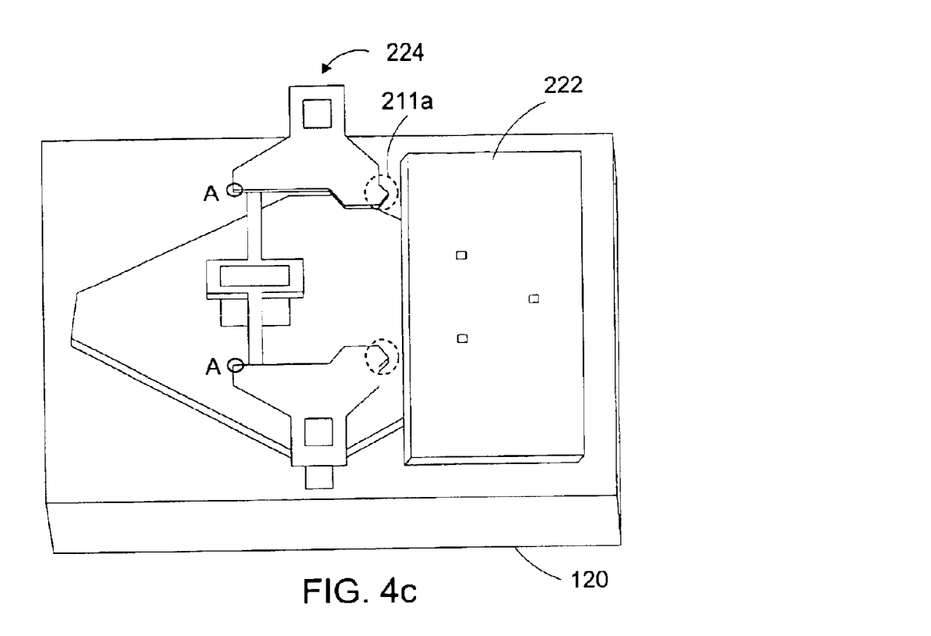
FIG. 4c illustrates yet another exemplary micromirror device according to yet another embodiment of the invention.

FIG. 4*b* illustrates a perspective view of a micromirror array device having an array of micromirrors of FIG. 4*a*. As shown in the figure, the extension plate of each micromirror extends beyond the mirror plate to which the extension plate is connected. As a result, the extension plate partially covers the mirror plates of the adjacent micromirrors. In the embodiment of the invention, the micromirror array device preferably comprises 1280×720, 14000×1050, 1600×1200, 1920×1080, or 2048×1536 micromirror devices, wherein m×n (e.g. 1280×720) represent 1280 micromirrors along the length of the micromirror array and 720 micromirrors along the width of the micromirror array. Of course, a micromirror array corresponds to other desired resolutions can also be formed using the micromirror device of FIG. 4*a*.

Referring to FIG. 4*c*, another exemplary micromirror device according to yet another embodiment of the invention is illustrated therein. Unlike those in FIG. 3*a* and FIG. 4*a*, hinge support 224 of the micromirror device is configured differently. In particular, stop 211*b* in FIGS. 3*a* and 4*a* is removed from the hinge support. And edges of the hinge support, such as edge points A are used as stops for stopping the rotation of the mirror plate. This configuration of the hinge allows for a larger extension plate (e.g. extension plate 222) compared to that in FIGS. 3*a* and 4*a*. As a result, the electric force necessary to rotate the mirror plate to a desired angle is reduced compared to the micromirror device having a smaller size mirror-extension, such as that in FIG. 4*a*. The same as that in FIGS. 3*a* and 4*a*, extension plate 222 can be metallic or dielectric. When the extension plate is metallic, it can be electrically connected to the mirror plate. The extension plate may be of any desired shape, such as square, rectangle, rhombus, or trapezoid. Moreover, the extension plate can be connected to the mirror plate through any number of posts. The extension plate can be spaced from the mirror plate with either the same or different distance as the hinge from the mirror plate. Specifically, the extension plate can be closer to or further away from the mirror plate than the hinge.

Figure 4D:
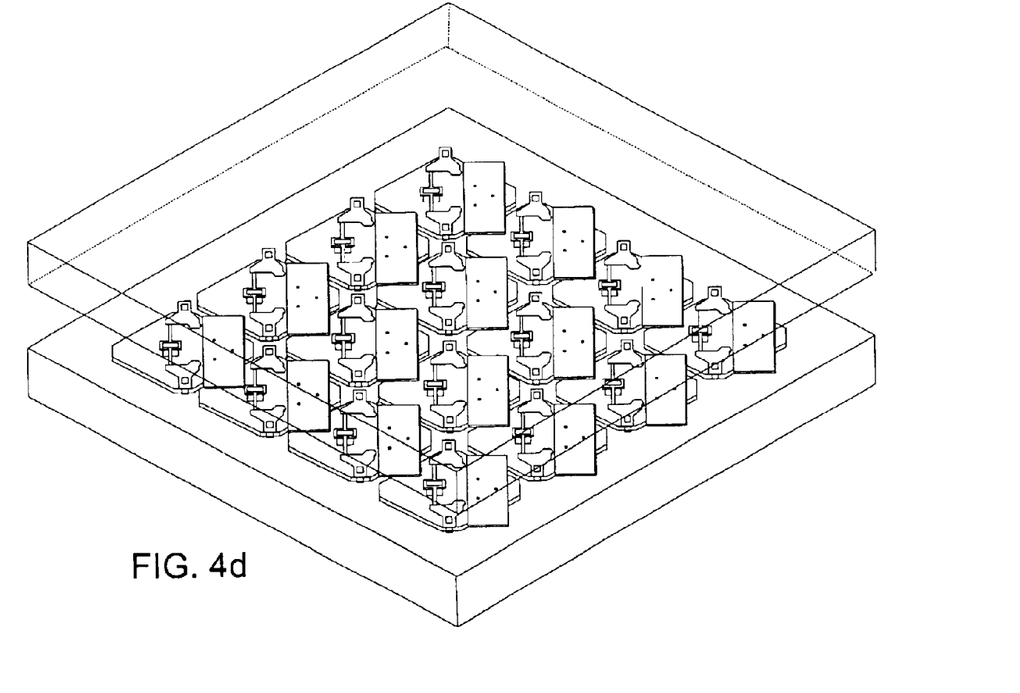
FIG. 4d presents a micromirror array device comprising a plurality of micromirror devices of FIG. 4c.

Referring to FIG. 4*d*, an exemplary micromirror array device is illustrated therein. The micromirror array device comprises an array of micromirrors of FIG. 4*c*. Because the configuration of the micromirror device allows for a large mirror-extension, the mirror-extension in each micromirror device of the array extends beyond the mirror plate of the micromirror device. And the extension plate of the micromirror covers a larger portion of the mirror plate of the adjacent micromirror device compared to that in FIG. 4*a*.

Figure 5:
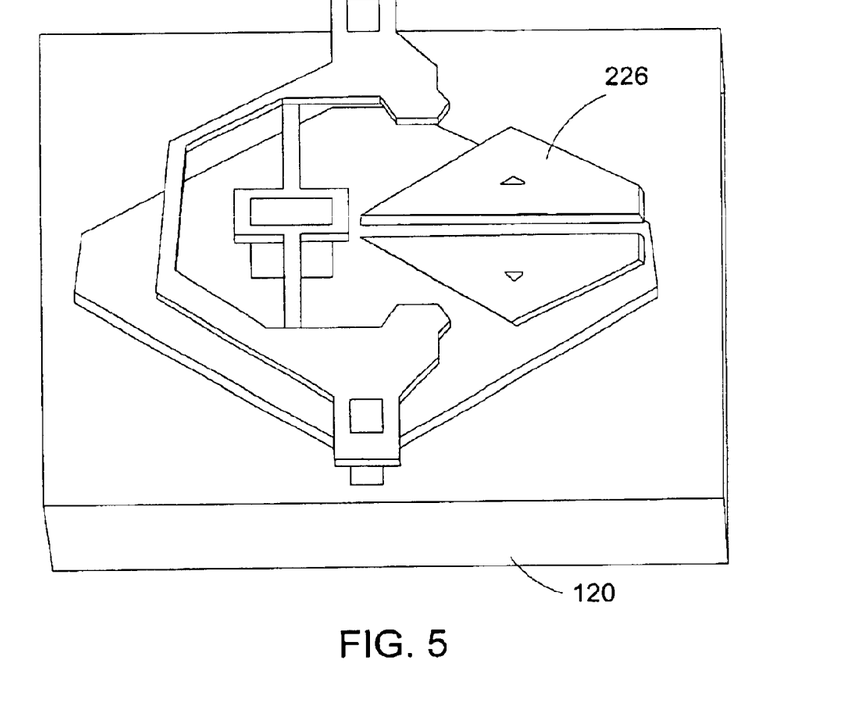
FIG. 5 illustrates yet another exemplary micromirror.

Alternative to one extension plate for each micromirror device, a plurality of mirror-extensions may be formed on the micromirror device, as shown in FIG. 5. In the specific exemplary micromirror device in FIG. 5, the micromirror device comprises two extension plates 226, each being connected to the mirror plate of the micromirror device through a separate post. Alternatively, any number of extension plates can be formed on the mirror plate. And any number of posts can be provided to connect the extension plates to the mirror plate.

There is a variety of ways to construct the micromirror devices described above. Exemplary processes will be discussed in the following with references to FIG. 8*a* through FIG. 11*d*. It should be appreciated by those ordinary skills in the art that the exemplary processes are for demonstration purpose only and should not be interpreted as limitations.

Figure 8A:
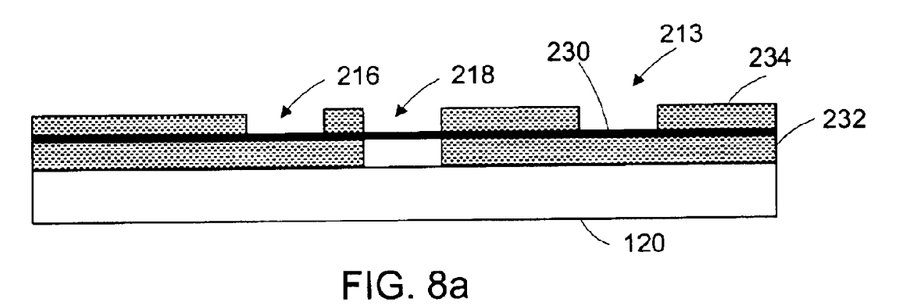
FIGS. 8a through 8d are side views of the micromirror device at different steps of an exemplary fabrication process.

FIGS. 8*a* through 8*d* are side views of the micromirror device (a cross-sectional view of the device is shown in FIG. 6) at different steps in an exemplary fabrication process for the micromirror device, wherein the micromirror device has a extension plate spaced from the mirror plate with the same distance as the hinge. Referring to FIG. 8*a*, substrate 120 is provided. First sacrificial layer 232 is deposited on the substrate followed by the deposition of mirror plate layer 230. The substrate can be a glass (e.g. 1737F, Eagle 2000), quartz, Pyrex™, sapphire. The substrate may also be a semiconductor substrate (e.g. silicon substrate) with one or more actuation electrodes and/or control circuitry (e.g. CMOS type DRAM) formed thereon. The first sacrificial layer may be any suitable material, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300–350° C. The thickness of the first sacrificial layer can be wide ranging depending upon the size of the micromirror device and desired maximum rotation angle of the mirror plate of the micromirror device, though a thickness of from 500 Å to 50,000 Å, preferably around 10,000 Å, is preferred. The first sacrificial layer may be deposited on the substrate using any suitable method, such as LPCVD or PECVD.

As an alternative feature of the embodiment, an anti-reflection layer (not shown) maybe deposited on the surface of the substrate. The anti-reflection layer is deposited for reducing the reflection of the incident light from the surface of the substrate. Other optical enhancing layers may also be deposited on either surface of the glass substrate as desired. In addition to the optical enhancing layers, an electrical conducting layer can be deposited on a surface of the substrate. This electrical conducting layer can be used as an electrode for driving the mirror plate to rotate, especially to an OFF state.

After depositing the first sacrificial layer, mirror plate 230 is deposited and patterned on the first sacrificial layer. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. The thickness of the micromirror plate can be wide ranging depending upon the desired mechanical (e.g. elastic module), the size of the micromirror, desired ON state angle and OFF state angle, and electronic (e.g. conductivity) properties of the mirror plate and the properties of the materials selected for forming the micromirror plate. In an embodiment of the invention, the mirror plate is a multi-layered structure, which comprises a $SiO_x$ layer with a preferred thickness around 400 Å, a light reflecting layer of aluminum with a preferred thickness around 2500 Å, and a titanium layer with a preferred thickness around 80 Å. In addition to aluminum, other materials, such as Ti, AlSiCu and TiAl, having high reflectivity to visible light can also be used for the light reflecting layer. These mirror plate layers can be deposited by PVD at a temperature preferably around 150° C.

After deposition, the mirror plate layer is patterned into a desired shape, such as that in FIG. 3*a*. The patterning of the micromirror can be achieved using standard photoresist patterning followed by etching using, for example CF4, Cl2, or other suitable etchant depending upon the specific material of the micromirror plate layer.

Following the patterning mirror plate 230, second sacrificial layer 234 is deposited on the mirror plate 230 and first sacrificial layer 232. The second sacrificial layer may comprise amorphous silicon, or could alternatively comprise one or more of the various materials mentioned above in reference to the first sacrificial layer. First and second sacrificial layers need not be the same, though are the same in the preferred embodiment so that, in the future, the etching process for removing these sacrificial materials can be simplified. Similar to the first sacrificial layer, the second sacrificial layer may be deposited using any suitable method, such as LPCVD or PECVD. In the embodiment of the invention, the second sacrificial layer comprises amorphous silicon deposited around 350° C. The thickness of the second sacrificial layer can be on the order of 9000 Å, but may be adjusted to any reasonable thickness, such as between 2000 Å and 20,000 Å depending upon the desired distance (in the direction perpendicular to the micromirror plate and the substrate) between the micromirror plate and the hinge. It is preferred that the hinge and mirror plate be separated by a gap with a size from 0.5 to 1.5 microns, more preferably from 0.5 to 0.8 micron, and more preferably from 0.8 to 1.25 microns, and more preferably from 1.25 to 1.5 microns.

In the preferred embodiment of the invention, the micromirror plate comprises aluminum, and the sacrificial layers (e.g. the first and second sacrificial layer) are amorphous silicon. This design, however, can cause defects due to the diffusion of the aluminum and silicon, especially around the edge of the mirror plate. To solve this problem, a protection layer (not shown) maybe deposited on the patterned micromirror plate before depositing the second sacrificial silicon layer such that the aluminum layer can be isolated from the silicon sacrificial layer. This protection may or may not be removed after removing the sacrificial materials. If the protection layer is not to be removed, it is patterned after deposition on the mirror plate.

The deposited second sacrificial layer is then patterned for forming two deep-via areas 218, shallow via area 216 and mirror-extension via 213 using standard lithography technique followed by etching, as shown in the figure. The etching step may be performed using $Cl_2$, $BCl_3$, or other suitable etchant depending upon the specific material(s) of the second sacrificial layer. The distance across the two deep-via areas depends upon the length of the defined diagonal of the micromirror plate. In an embodiment of the invention, the distance across the two deep-via areas after the patterning is preferably around 10 µm, but can be any suitable distance as desired. In order to form the shallow-via area, an etching step using $CF_4$ or other suitable etchant may be executed. The shallow-via area, which can be of any suitable size, is preferably on the order of 2.2 microns. And the size of each deep-via is around 0.5 micron.

Figure 8B:
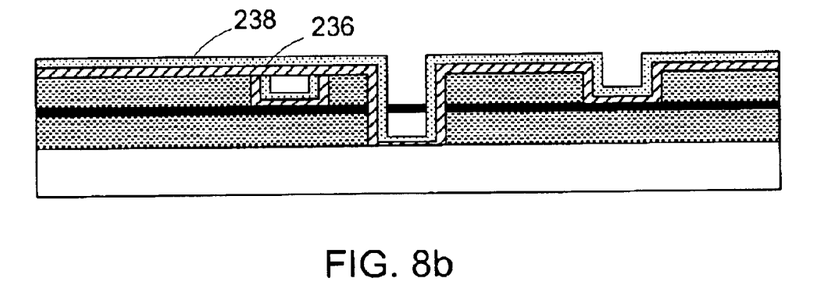

After patterning the second sacrificial layer, hinge support layers 236 and 238 are deposited on the patterned second sacrificial layer, as shown in FIG. 8b. Because the hinge support layers are designated for holding the hinge (e.g. 214 in FIG. 3a) and the mirror plate (e.g. mirror plate 230 in FIG. 3a) attached therewith such that the mirror plate can rotate, it is desired that the hinge support layers comprise of materials having at least large elastic modulus. According to an embodiment of the invention, layer 236 comprises a 400 Å thickness of $TiN_x$ (although it may comprise $TiN_x$, and have a thickness between 100 Å and 2000 Å) layer deposited by PVD, and a 3500 Å thickness of $SiN_x$ (although the thickness of the $SiN_x$ layer may be between 2000 Å and 10,000 Å) layer 238 deposited by PECVD. Of course, other suitable materials and methods of deposition may be used (e.g. methods, such as LPCVD or sputtering). The $TiN_x$ layer is not necessary for the invention, but provides a conductive contact surface between the micromirror and the hinge in order to, at least, reduce charge-induced stiction.

Figure 8C:
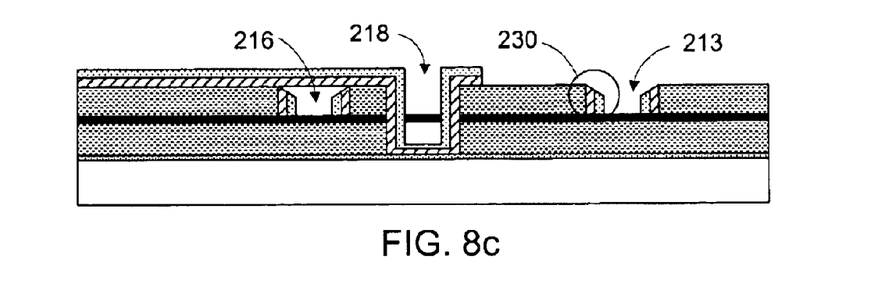

After the deposition, layers 236 and 238 are patterned into a desired configuration (e.g. hinge support 210 in FIG. 3a), as shown in FIG. 8c. The mirror stops, such as the mirror stops (e.g. mirror stop 211a in FIG. 3a) corresponding to the "ON" state and/or mirror stops (e.g. mirror stops 211b in FIG. 3a) corresponding to the "OFF" state can also be configured. An etching step using one or more proper etchants is then performed afterwards. In particular, the layers can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.).

After etching the hinge support layers, two posts 218 (the two posts are overlapped in the figure), hinge contact area 216 and mirror-extension via 213 are formed. The bottom segments of hinge contact area 216 and mirror-extension via 213 are removed by etching and a part of the mirror plate underneath the hinge contact area is thus exposed. The exposed parts of the mirror plate will be used to form an electric-contact with external electric source. The sidewalls (e.g. sidewall 240) of the hinge contact area 216 and mirror-extension via are left with residues of layers 236 and 238 after etching. The residue on the sidewalls helps to enhance the mechanical and electrical properties of the hinge that will be formed afterwards.

Figure 8D:
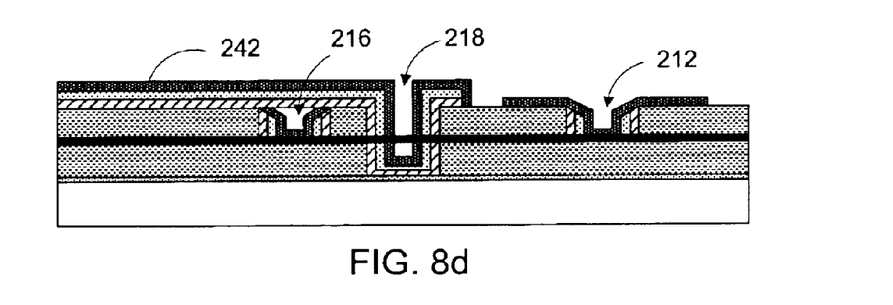

After the completion of patterning and etching of layers 236 and 238, hinge layer 242 is deposited and then patterned as shown in FIG. 8d. In the embodiment of the invention, the hinge layer is electrically conductive. Examples of suitable materials for the hinge layer are Al, Ir, titanium, titanium nitride, titanium oxide(s), titanium carbide, $TiSiN_x$, $TaSiN_x$, or other ternary and higher compounds. When titanium is selected for the hinge layer, it can be deposited at 100° C. Alternatively, the hinge layer may comprise of multi-layers, such as 100 Å $TiN_x$ and 400 Å $SiN_x$.

Following the deposition, the hinge layer is patterned using etching for forming the hinge (e.g. hinge 214 in FIG. 3a) in hinge area 216 and the extension plate (e.g. extension plate 212 in FIG. 3a) in mirror-extension area 212. Similar to the hinge support layers (layers 236 and 238), hinge layer 242 can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

In the above example, the extension plate has the same material as the hinge, and the extension plate is spaced from the mirror plate with the same distance as the hinge. Thereby, the extension plate can be fabricated (e.g. deposited and etched) at the same time. If the extension plate comprises a material that is different from the hinge, the hinge and the extension plate can be fabricated separately on the patterned hinge support layers. In this case, a third sacrificial layer may be deposited and a separate etching step may be performed. For example, the third sacrificial layer is deposited on the patterned hinge layer (the hinge material at the mirror-extension area 212 will be removed after patterning the hinge layer). And the third sacrificial layer is patterned so as to expose mirror-extension area 212 for depositing the mirror-extension layer that comprises different material from the hinge. Then the deposited mirror-extension layer is patterned to form the desired extension plate. In the above example, the hinge is formed followed by forming the extension plate. Alternatively, the extension plate can be formed before forming the hinge. Similar processes (e.g. depositing and patterning the mirror-extension layer and depositing and patterning the third sacrificial layer followed by depositing and patterning the hinge layer on the patterned) can be applied, which will not be discussed further.

Finally, the micromirror device is released by removing the sacrificial layers using proper etching process with selected etchants. The release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, which is incorporated herein by reference). Of course, the etchants and methods selected should be matched to the sacrificial materials being removed and the desired materials being left behind.

Figure 9:
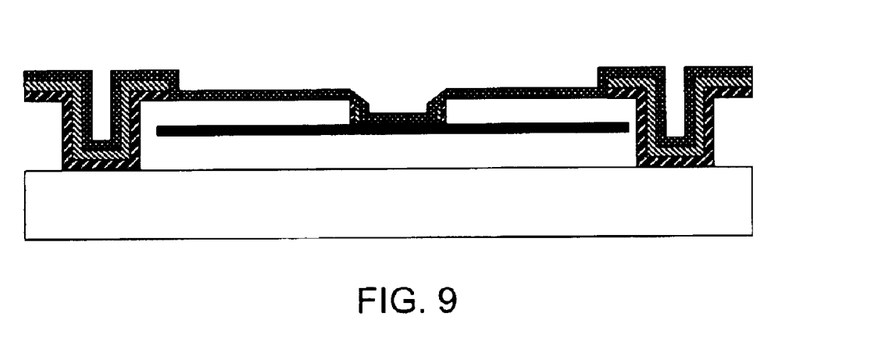
FIG. 9 is a cross-sectional view of the micromirror device of FIGS. 8a through 8d after releasing.
Figure 10:
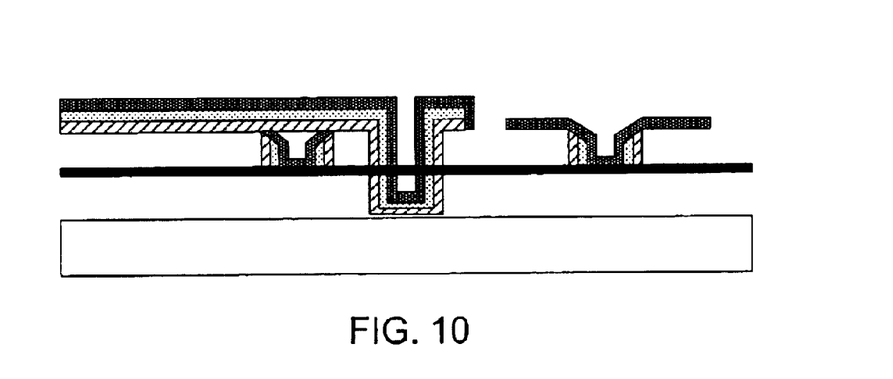
FIG. 10 is a side view of the micromirror device of FIGS. 8a through 8d after releasing.

FIG. 9 illustrates a cross-sectional view of the micromirror device after releasing. And FIG. 10 illustrates a side view of the same micromirror device of FIG. 9.

As discussed earlier, the extension plate (e.g. extension plate 212 in FIG. 3a) can be spaced from the mirror plate with a different distance than the hinge. An exemplary fabrication process for such micromirror device will be discussed in the following with reference to FIGS. 11a through 11d, wherein side views of the micromirror device (a cross-sectional view of the device is shown in FIG. 7) at different steps in the fabrication process are illustrated therein.

Figure 11A:
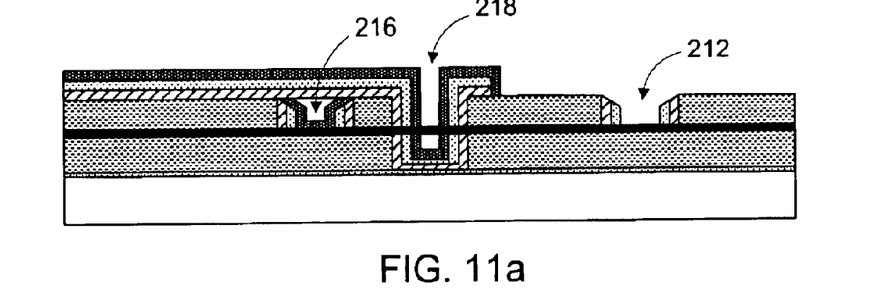
FIGS. 11a through 11d are side views of a micromirror device at different steps of another exemplary fabrication process.
Figure 11B:
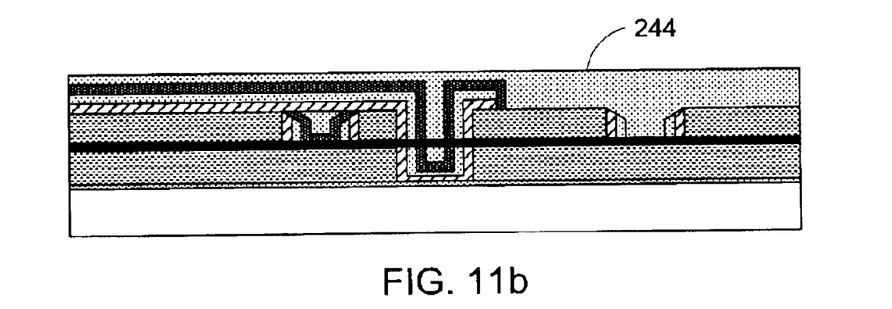
Figure 11C:
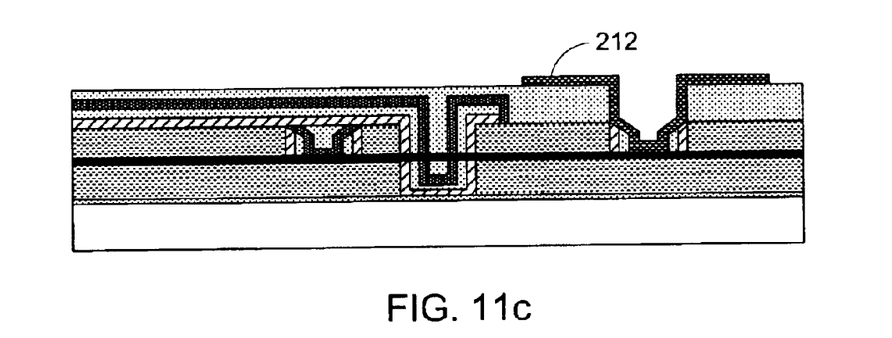
Figure 11D:
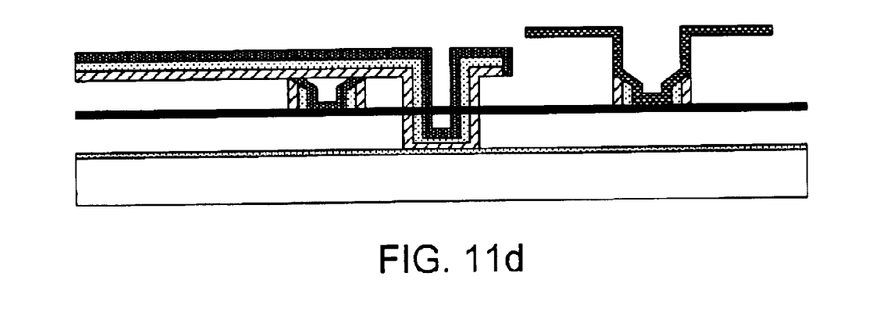

Referring to FIG. 11a, the same steps discussed in FIGS. 8a through 8d are performed before patterning the hinge layer. In this exemplary process, the hinge layer is patterned such that the hinge layer at the mirror-extension area 212 as shown in FIG. 8d is removed after patterning. Third sacrificial layer 244 is then deposited on the patterned hinge layer, as shown in FIG. 11b. The thickness of the deposited third sacrificial layer determines the distance between the extension plate (e.g. 212 in FIG. 3a) and the mirror plate (e.g. 230 in FIG. 3a). After depositing, the third sacrificial layer is patterned. On the patterned third sacrificial layer, the mirror-extension layer is deposited and patterned, as shown in FIG. 11c. Finally, the micromirror device is released by removing the three sacrificial layers using etching. The micromirror after releasing is illustrated in FIG. 11d.

FIGS. 11a through 11d illustrate fabrication processes for a micromirror device having a extension plate being spaced from the mirror plate as a distance larger than the hinge. A similar fabrication process can be followed so as to fabricate a micromirror device a extension plate being spaced from the mirror plate at a distance shorter than the hinge.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A micromirror device, comprising:

a substrate;

a hinge and a hinge support connected to the substrate;

a movable reflective mirror plate, wherein the hinge is attached to the mirror plate at a first location on the mirror plate;

an extension plate connected to the mirror plate at a second location on the mirror plate;

wherein the extension plate defines a first gap between the extension plate and the mirror plate; and wherein the extension plate is connected to the mirror plate via a post.

2. The device of claim 1, wherein the extension plate defines a second gap between the extension plate and the substrate.

3. The device of claim 1, further comprising:

an electrode disposed on another substrate and placed proximate to the extension plate such that a first electrostatic field can be established between said electrode and the extension plate; and wherein the extension plate defines a third gap between the extension plate and the substrate on which the electrode is disposed.

4. The device of claim 1, wherein the extension plate is on the opposite side of the mirror plate to the substrate.

5. The device of claim 1, wherein the extension plate is electrically conducting.

6. The device of claim 1, wherein the extension plate is dielectric with a dielectric constant larger than 1.0.

7. The device of claim 1, wherein the extension plate is extended beyond the mirror plate.

8. The device of claim 1, wherein the mirror plate is attached to the hinge such that the mirror plate rotates along a rotation axis that is parallel to but offset from a diagonal of the mirror plate when viewed from the top of the substrate.

9. The device of claim 1, wherein the extension plate is spaced from the substrate at a distance the same as that between the hinge support and the substrate.

10. The device of claim 1, further comprising:
a first electrode placed proximate to the extension plate such that a first electrostatic field can be established between the first electrode and the extension plate, and the mirror plate rotates relative to the substrate in response to the first electrostatic field in a first rotational direction.

11. The device of claim 10, further comprising:
a second electrode placed proximate to the mirror plate such that a second electrostatic field can be established between the minor plate and the second electrode, and the mirror plate rotates relative to the substrate in response to the second electrostatic field in a second rotation direction that is opposite to the first rotation direction.

12. The device of claim 11, wherein the first electrode and the second electrode are on a substrate other than the substrate to which the hinge support is connected.

13. The device of claim 11, wherein the first electrode is on a substrate other than the substrate to which the hinge support is connected; and wherein the second electrode is on the substrate to which the hinge support in connected.

14. The devices of claim 11, wherein the second electrode is an electrode film on a surface of the substrate to which the hinge support is connected.

15. A micromirror device, comprising:
a substrate;
a reflective mirror plate connected to the substrate via a hinge and a hinge support and held by the hinge and the hinge support of the substrate;
an extension plate connected to the mirror plate and connected to the substrate via the mirror plate, the hinge, and the hinge support;
wherein the extension plate defines a first gap between the extension plate and the mirror plate; and wherein the extension plate is connected to the mirror plate via a post.

16. The device of claim 15, wherein the extension plate defines a second gap between the extension plate and the substrate.

17. The device of claim 15, further comprising:
an electrode disposed on another substrate and placed proximate to the extension plate such that a first electrostatic field can be established between said electrode and the extension plate; and wherein the extension plate defines a third gap between the extension plate and the substrate on which the electrode is disposed.

18. The device of claim 15, wherein the extension plate is on the opposite side of the mirror plate to the substrate.

19. The device of claim 15, wherein the extension plate is electrically conducting.

20. The device of claim 15, wherein the extension plate is dielectric with a dielectric constant larger than 1.0.

21. The device of claim 15, wherein the extension plate is extended beyond the mirror plate.

22. The device of claim 15, wherein the mirror plate is attached to the hinge such that the mirror plate rotates along a rotation axis that is parallel to but offset from a diagonal of the mirror plate when viewed from the top of the substrate.

23. The device of claim 15, wherein the extension plate is spaced from the substrate at a distance the same as that between the hinge support and the substrate.

24. The device of claim 15, further comprising:
a first electrode placed proximate to the extension plate such that a first electrostatic field can be established between the first electrode and the extension plate, and the mirror plate rotates relative to the substrate in response to the first electrostatic field in a first rotational direction.

25. The device of claim 24, further comprising:
a second electrode placed proximate to the mirror plate such that a second electrostatic field can be established between the mirror plate and the second electrode, and the mirror plate rotates relative to the substrate in response to the second electrostatic field in a second rotation direction that is opposite to the first rotation direction.

26. The device of claim 25, wherein the first electrode and the second electrode are on a substrate other than the substrate to which the hinge support is connected.

27. The device of claim 25, wherein the first electrode is on a substrate other than the substrate to which the hinge support is connected; and wherein the second electrode is on the substrate to which the hinge support is connected.

28. The device of claim 27, wherein the second electrode is an electrode film on a surface of the substrate to which the hinge and the hinge support are connected.

29. A micromirror device, comprising:
a substrate;
a hinge and a hinge support connected to the substrate;
a reflective mirror plate attached to the hinge at an attachment point that is located away from a diagonal of the mirror plate when viewed from the top of the substrate;
an extension plate connected to the mirror plate;
wherein the extension plate defines a first gap between the extension plate and the mirror plate; and wherein the extension plate is connected to the mirror plate via a post.

30. The device of claim 29, wherein the extension plate is on the opposite side of the mirror plate to the substrate.

31. The device of claim 29, wherein the extension plate is metallic.

32. A display system, comprising:
a light source;
an array of micromirrors that selectively reflect light from the light source, each micromirror further composing:
a substrate;
a hinge and a hinge support connected to the substrate;

a moveable reflective mirror plate, wherein the hinge is attached to the mirror plate;
at a first location on the mirror plate;
an extension plate connected to the mirror plate at a second location on the mirror plate;
wherein the extension plate defines a first gap between the extension plate and the mirror plate; wherein the extension plate is connected to the mirror plate via a post; and
a set of optical elements for directing light from the light source onto the spatial light modulator and projecting the reflected light from the micromirrors onto a display target.

33. The display system of claim 32, wherein the extension plate defines a second gap between the extension plate and the substrate.

34. The display system of claim 32, further comprising:
an electrode disposed on another substrate and placed proximate to the extension plate such that a first electrostatic field can be established between said electrode and the extension plate; and
wherein the extension plate defines a third gap between the extension plate and the substrate on which the electrode is disposed.

35. The display system of claim 32, wherein the mirror plate is on the opposite side of the mirror plate to the substrate.

36. The display system of claim 32, wherein the extension plate is electrically conducting.

37. The display system of claim 32, wherein the extension plate is extended beyond the micromirror plate.

38. The display system of claim 32, wherein the mirror plate is attached to the hinge such that the mirror plate rotates along a rotation axis that is parallel to but offset from a diagonal of the mirror plate when viewed from the top of the substrate.

39. The display system of claim 32, wherein the extension plate is spaced from the substrate at a distance the same as that between the hinge support and the substrate.

40. The display system of claim 32, further comprising:
a first electrode proximate to the extension plate such that a first electrostatic field can be established between the first electrode and the extension plate, and the mirror plate rotates relative to the substrate in response to the first electrostatic field in a first rotational direction.

41. The display system of claim 40, further comprising:
a second electrode proximate to the mirror plate such that a second electrostatic field can be established between the mirror plate and the second electrode, and the mirror plate rotates relative to the substrate in response to the second electrostatic field in a second rotation direction that is opposite to the first rotation direction.

42. The display system of claim 4, wherein the second electrode is an electrode film on a surface of the substrate to which the hinge support is connected.

* * * * *